US011847346B2

(12) United States Patent
Shani et al.

(10) Patent No.: US 11,847,346 B2
(45) Date of Patent: Dec. 19, 2023

(54) SYSTEM AND METHOD FOR COOPERATIVE TAIL PROMOTION IN A LOG BUFFER

(71) Applicant: EMC IP Holding Company, LLC, Hopkinton, MA (US)

(72) Inventors: Nimrod Shani, Raanana (IL); Ronen Gazit, Tel Aviv (IL); Uri Shabi, Tel Mond (IL)

(73) Assignee: EMC IP Holding Company, LLC, Hopkinton, MA (US)

(*) Notice: Subject to any disclaimer, the term of this patent is extended or adjusted under 35 U.S.C. 154(b) by 72 days.

(21) Appl. No.: 16/897,463

(22) Filed: Jun. 10, 2020

(65) Prior Publication Data

US 2021/0389905 A1    Dec. 16, 2021

(51) Int. Cl.
*G06F 3/06* (2006.01)

(52) U.S. Cl.
CPC .......... *G06F 3/0656* (2013.01); *G06F 3/0604* (2013.01); *G06F 3/067* (2013.01)

(58) Field of Classification Search
CPC ........ G06F 3/06; G06F 3/0656; G06F 3/0604; G06F 3/067; G06F 3/0659; G06F 3/061; G06Q 10/06
USPC ....................................................... 711/154
See application file for complete search history.

(56) References Cited

U.S. PATENT DOCUMENTS

| | | | | |
|---|---|---|---|---|
| 7,631,155 B1 * | 12/2009 | Bono | ................... | G06F 3/0608 711/170 |
| 9,286,007 B1 * | 3/2016 | Bono | ..................... | G06F 3/067 |
| 10,114,829 B1 * | 10/2018 | Bono | ................... | G06F 16/172 |
| 2011/0258391 A1 * | 10/2011 | Atkisson | ............... | G06F 11/108 711/E12.017 |
| 2021/0263763 A1 * | 8/2021 | Kowalski | ............. | G06F 9/5016 |

OTHER PUBLICATIONS

Microsoft Computer Dictionary—5th Edition (2002) (Year: 2002).*

* cited by examiner

*Primary Examiner* — Michael Krofcheck
(74) *Attorney, Agent, or Firm* — Brian J. Colandreo; Heath M. Sargeant; Holland & Knight LLP

(57) ABSTRACT

A method, computer program product, and computing system for receiving data for storage in a storage system. The data may be written to a head entry of a log buffer, wherein the log buffer includes a plurality of data entries for flushing to the storage system. At least a portion of the plurality of data entries of the log buffer may be flushed, via a plurality of threads, to the storage system based upon, at least in part, a tail entry of the log buffer. A queue of committed data entries may be updated, via each thread of the plurality of threads, with one or more data entries of the log buffer flushed to the storage system by each thread. A new tail entry of the log buffer may be determined, via a thread of the plurality of threads, based upon, at least in part, the queue of committed data entries.

11 Claims, 7 Drawing Sheets

SYSTEM AND METHOD FOR COOPERATIVE TAIL PROMOTION IN A LOG BUFFER

BACKGROUND

Storing and safeguarding electronic content may be beneficial in modern business and elsewhere. Accordingly, various methodologies may be employed to protect and distribute such electronic content.

Multiple storage nodes of a storage cluster may be configured in an active/active configuration where processing of data by one storage node may be synchronized to the other storage node(s). As new data is received by each storage node, the new data may be stored in a log buffer which may be synchronized to the other storage node(s). The task of transferring data from the log buffer to more permanent storage may be accomplished by various threads. However, data of the log buffer may not be transferred or processed by the various threads in any defined order, making it difficult to identify which data of the log buffer to process next.

SUMMARY OF DISCLOSURE

In one example implementation, a computer-implemented method executed on a computing device may include, but is not limited to, receiving data for storage in a storage system. The data may be written to a head entry of a log buffer, wherein the log buffer includes a plurality of data entries for flushing to the storage system. At least a portion of the plurality of data entries of the log buffer may be flushed, via a plurality of threads, to the storage system based upon, at least in part, a tail entry of the log buffer. A queue of committed data entries may be updated, via each thread of the plurality of threads, with one or more data entries of the log buffer flushed to the storage system by each thread. A new tail entry of the log buffer may be determined, via a thread of the plurality of threads, based upon, at least in part, the queue of committed data entries.

One or more of the following example features may be included. Flushing, via the plurality of threads, the at least a portion of the plurality of data entries of the log buffer to the storage system may include assigning one or more data entries of the log buffer to each thread of the plurality of threads for flushing to the storage system, wherein the first data entry assigned to the plurality of threads is the tail entry of the log buffer. It may be determined whether the thread has flushed the tail entry of the log buffer. Committed data entries from the queue of committed data entries may be aggregated into a list of one or more committed data entries and one or more uncommitted data entries in response to determining that the thread has flushed the tail entry of the log buffer. Determining the new tail entry of the log buffer may include determining a first uncommitted data entry from the list of the one or more committed data entries and the one or more uncommitted data entries. Additional entries of the plurality of data entries of the log buffer assigned to the thread may be flushed in response to determining that the thread has not flushed the tail entry of the log buffer. The queue of committed data entries may be separate from the log buffer.

In another example implementation, a computer program product resides on a computer readable medium that has a plurality of instructions stored on it. When executed by a processor, the instructions cause the processor to perform operations that may include, but are not limited to, receiving data for storage in a storage system. The data may be written to a head entry of a log buffer, wherein the log buffer includes a plurality of data entries for flushing to the storage system. At least a portion of the plurality of data entries of the log buffer may be flushed, via a plurality of threads, to the storage system based upon, at least in part, a tail entry of the log buffer. A queue of committed data entries may be updated, via each thread of the plurality of threads, with one or more data entries of the log buffer flushed to the storage system by each thread. A new tail entry of the log buffer may be determined, via a thread of the plurality of threads, based upon, at least in part, the queue of committed data entries.

One or more of the following example features may be included. Flushing, via the plurality of threads, the at least a portion of the plurality of data entries of the log buffer to the storage system may include assigning one or more data entries of the log buffer to each thread of the plurality of threads for flushing to the storage system, wherein the first data entry assigned to the plurality of threads is the tail entry of the log buffer. It may be determined whether the thread has flushed the tail entry of the log buffer. Committed data entries from the queue of committed data entries may be aggregated into a list of one or more committed data entries and one or more uncommitted data entries in response to determining that the thread has flushed the tail entry of the log buffer. Determining the new tail entry of the log buffer may include determining a first uncommitted data entry from the list of the one or more committed data entries and the one or more uncommitted data entries. Additional entries of the plurality of data entries of the log buffer assigned to the thread may be flushed in response to determining that the thread has not flushed the tail entry of the log buffer. The queue of committed data entries may be separate from the log buffer.

In another example implementation, a computing system includes at least one processor and at least one memory architecture coupled with the at least one processor, wherein the at least one processor may be configured to receive data for storage in a storage system. The at least one processor may be further configured to write the data to a head entry of a log buffer, wherein the log buffer includes a plurality of data entries for flushing to the storage system. The at least one processor may be further configured to flush, via a plurality of threads, at least a portion of the plurality of data entries of the log buffer to the storage system based upon, at least in part, a tail entry of the log buffer. The at least one processor may be further configured to update, via each thread of the plurality of threads, a queue of committed data entries with one or more data entries of the log buffer flushed to the storage system by each thread. The at least one processor may be further configured to determine, via a thread of the plurality of threads, a new tail entry of the log buffer based upon, at least in part, the queue of committed data entries.

One or more of the following example features may be included. Flushing, via the plurality of threads, the at least a portion of the plurality of data entries of the log buffer to the storage system may include assigning one or more data entries of the log buffer to each thread of the plurality of threads for flushing to the storage system, wherein the first data entry assigned to the plurality of threads is the tail entry of the log buffer. It may be determined whether the thread has flushed the tail entry of the log buffer. Committed data entries from the queue of committed data entries may be aggregated into a list of one or more committed data entries and one or more uncommitted data entries in response to determining that the thread has flushed the tail entry of the log buffer. Determining the new tail entry of the log buffer may include determining a first uncommitted data entry from the list of the one or more committed data entries and the one or more uncommitted data entries. Additional entries of the plurality of data entries of the log buffer assigned to the thread may be flushed in response to determining that the thread has not flushed the tail entry of the log buffer. The queue of committed data entries may be separate from the log buffer.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
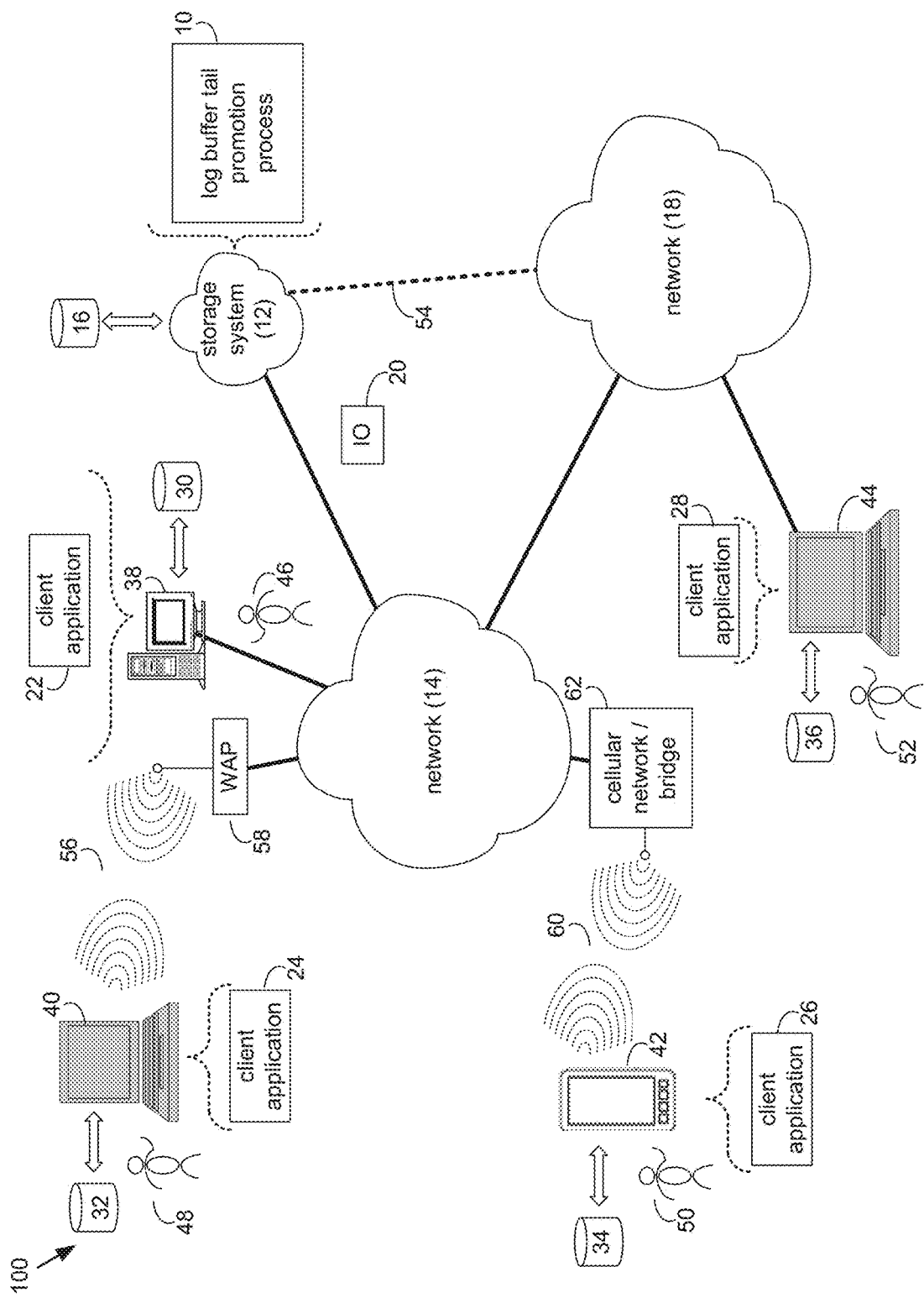
FIG. 1 is an example diagrammatic view of a storage system and a log buffer tail promotion process coupled to a distributed computing network according to one or more example implementations of the disclosure.

System Overview:

Referring to FIG. 1, there is shown log buffer tail promotion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of log buffer tail promotion process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of log buffer tail promotion process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a log buffer tail promotion process, such as log buffer tail promotion process 10 of FIG. 1, may include but is not limited to, receiving data for storage in a storage system. The data may be written to a head entry of a log buffer, wherein the log buffer includes a plurality of data entries for flushing to the storage system. At least a portion of the plurality of data entries of the log buffer may be flushed, via a plurality of threads, to the storage system based upon, at least in part, a tail entry of the log buffer. A queue of committed data entries may be updated, via each thread of the plurality of threads, with one or more data entries of the log buffer flushed to the storage system by each thread. A new tail entry of the log buffer may be determined, via a thread of the plurality of threads, based upon, at least in part, the queue of committed data entries.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
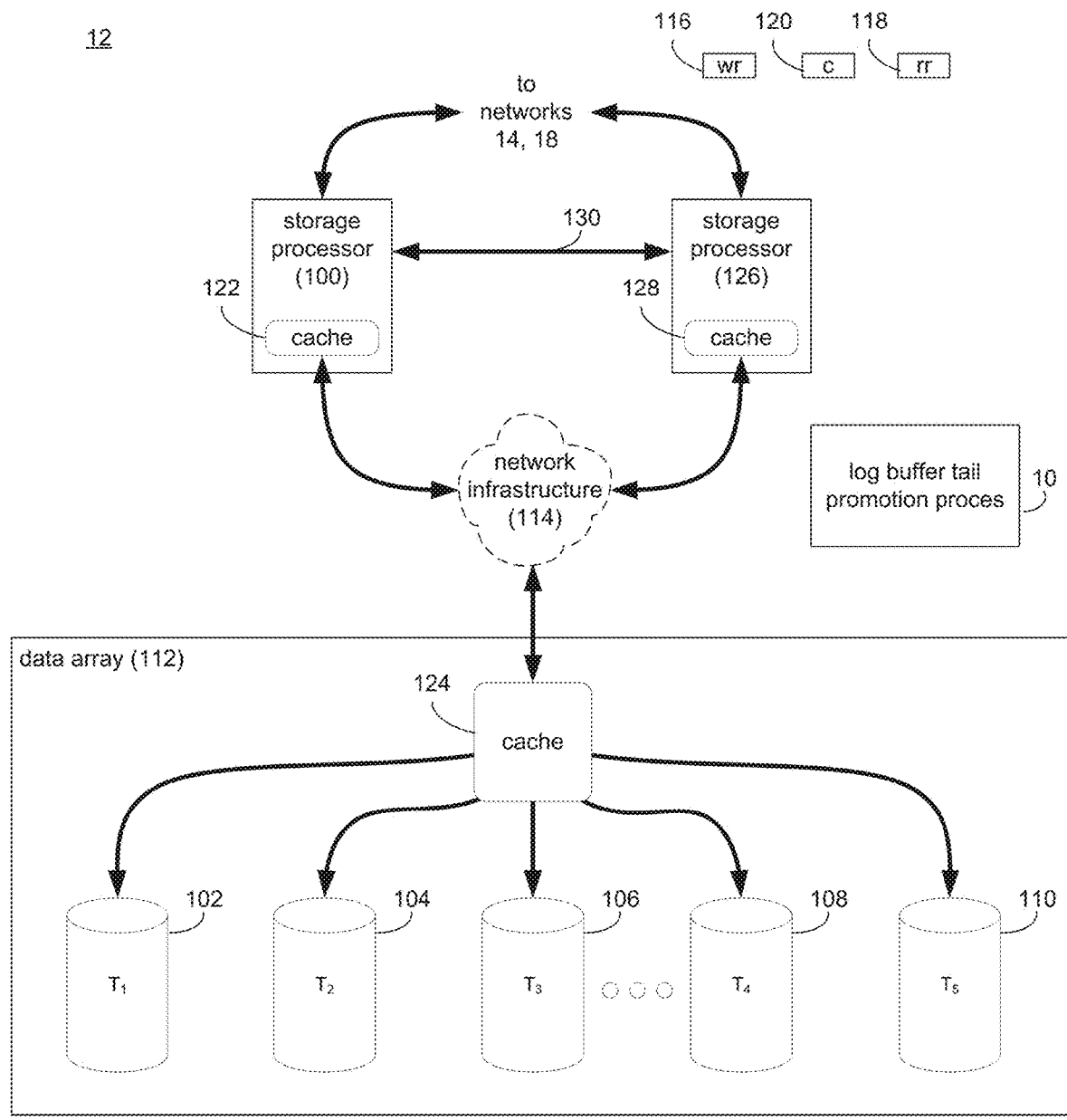
FIG. 2 is an example diagrammatic view of the storage system of FIG. 1 according to one or more example implementations of the disclosure.
Figure 3:
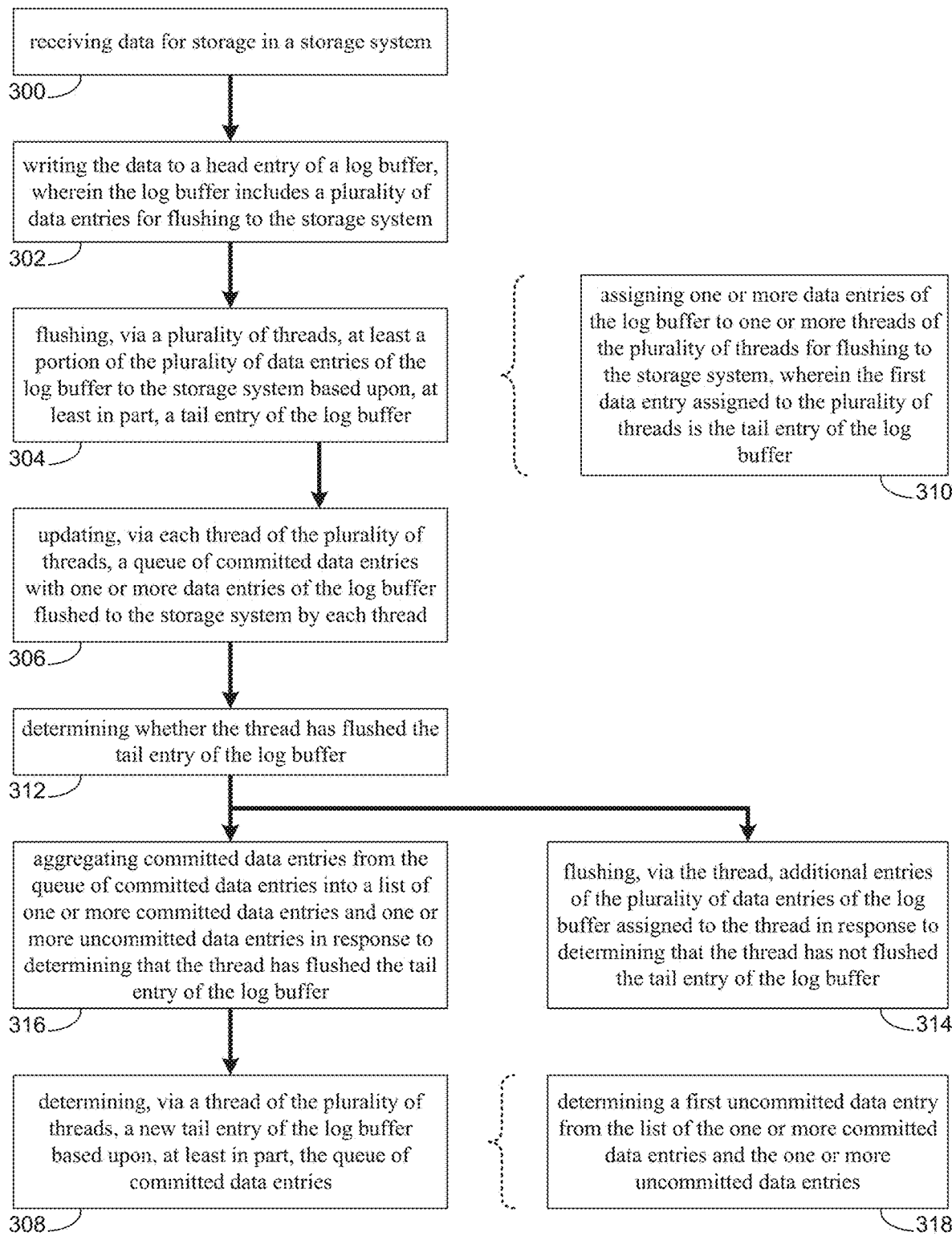
FIG. 3 is an example flowchart of the log buffer tail promotion process of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of log buffer tail promotion process 10. The instruction sets and subroutines of log buffer tail promotion process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of log buffer tail promotion process 10 may be stored on storage devices (and/or executed by processors and memory architectures) that are external to storage system 12.

As discussed above, various IO requests or commands (e.g. IO request 20) may be generated. For example, these TO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of log buffer tail promotion process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of log buffer tail promotion process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of log buffer tail promotion process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of log buffer tail promotion process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130). In some implementations, one of the storage processors may fail which may cause a significant amount of desynchronization between the storage processors.

The Log Buffer Tail Promotion Process:

Referring also to FIGS. 3-9 and in some implementations, log buffer tail promotion process 10 may receive 300 data for storage in a storage system. The data may be written 302 to a head entry of a log buffer, wherein the log buffer includes a plurality of data entries for flushing to the storage system. At least a portion of the plurality of data entries of the log buffer may be flushed 304, via a plurality of threads, to the storage system based upon, at least in part, a tail entry of the log buffer. A queue of committed data entries may be updated 306, via each thread of the plurality of threads, with one or more data entries of the log buffer flushed to the storage system by each thread. A new tail entry of the log buffer may be determined 308, via a thread of the plurality of threads, based upon, at least in part, the queue of committed data entries.

As will be discussed in greater detail below, implementations of the present disclosure may cooperatively promote a new tail entry in a log buffer. For example and as will be discussed in greater detail below, conventional approaches for processing entries of a log buffer may include various threads being assigned entries from the log buffer for flushing to a storage system and reporting back to the log buffer. As each thread flushes its assigned entries, it may lock the log buffer to report its progress. Further, when a thread has flushed the tail entry (i.e., "holding the tail entry"), the thread may lock the log buffer until it determines the next tail entry.

In some implementations, the thread may traverse a very long path of entries of the log buffer in order to determine which entry to promote as the new tail entry. Accordingly, implementations of the present disclosure may process the log buffer to promote or determine a new tail entry based on log buffer metadata provided by each thread in response to processing the entries assigned to the respective thread with better balancing between central processing unit (CPU) cores, faster tail movement or promotion, shorter spin-lock contention, and a significant reduction in CPU core monopolization by a thread holding the tail entry. In this manner, the ability for a storage system to process new data received from host computing devices may be improved over conventional approaches.

Figure 4:
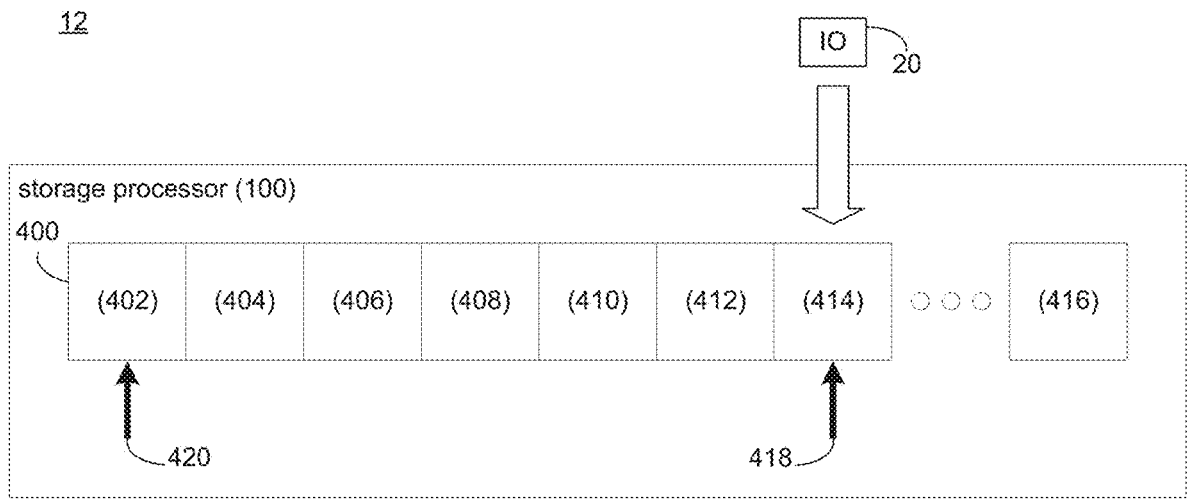
FIGS. 4-7 are example diagrammatic views of the operation of log buffers within a storage processor according to one or more example implementations of the disclosure.

In some implementations, log buffer tail promotion process 10 may receive 300 data for storage in a storage system. Referring also to the example of FIG. 4 and in some implementations, log buffer tail promotion process 10 may receive 300 data (e.g., content of input/output (IO) request 20) for storage in a storage system (e.g., storage system 12). As discussed above, log buffer tail promotion process 10 may receive IO request 20 at a storage processor (e.g., storage processor 100 and/or storage processor 126). In some implementations, multiple storage processors (e.g., storage processors 100, 126) may be configured in an active/active configuration such that data received by one storage processor may be made available to the other storage processor(s). In the event of one storage processor failure, another storage processor may continue to process IO requests on the storage system. As shown in FIG. 4, suppose a storage processor (e.g., storage processor 100) receives an IO request (IO request 20) for storing data within the storage system (e.g., storage system 12). In this example, log buffer tail promotion process 10 may receive 300 the data (e.g., IO request 20) at a storage processor (e.g., storage processor 100) communicatively coupled to a data array (e.g., data array 112).

In some implementations, log buffer tail promotion process 10 may write 302 the data to a head entry of a log buffer, wherein the log buffer may include a plurality of data entries for flushing to the storage system. Referring again to the example of FIG. 4 and in some implementations, a storage processor (e.g., storage processor 100) of a storage system (e.g., storage system 12) may include a log buffer (e.g., log buffer 400) configured to store data received for storage in the storage system. In some implementations, the log buffer (e.g., log buffer 400) may be a circular ring buffer. A circular ring buffer may generally include a data structure of a defined capacity that is configured to store data. Data may be added to the circular ring buffer until the circular ring buffer is full. Once the circular ring buffer is filled, new data may overwrite the oldest data previously written to the circular ring buffer. In this manner, the circular ring buffer may continuously write new data despite a limited size by overwriting old data with new data. However, it will be appreciated that other types of buffers may be used within the scope of the present disclosure.

In one example, a log buffer (e.g., log buffer 400) may include a page log buffer, where the log buffer holds newly received dirty/update pages before they are written to a final storage location in the storage system (e.g., within data array 112). In some implementations, the log buffer may be large (e.g., two million four kilobyte (4 KB) pages (i.e., a log buffer with an eight gigabyte (8 GB)) capacity). However, it will be appreciated that the log buffer (e.g., log buffer 400) may be of any size or capacity within the scope of the present disclosure.

Referring again to the example of FIG. 4 and in some implementations, a log buffer (e.g., log buffer 400) may include a plurality of data entries (e.g., data entries 402, 404, 406, 408, 410, 412, 414, 416). In some implementations, the plurality of data entries (e.g., data entries 402, 404, 406, 408, 410, 412, 414, 416) of the log buffer (e.g., log buffer 400) may include portions of data for flushing to the storage system (e.g., flushing from storage processor 100 to data array 112). As discussed above and in some implementations, each data entry of log buffer 400 may be a page of received dirty data to be flushed to a final storage location in the storage system (e.g., within data array 112). While an example of a log buffer with e.g., eight data entries has been described, it will be appreciated that any number of data entries or pages may be used within the scope of the present disclosure.

In one example, suppose a host computing device (e.g., client device 38, 40, 42, 44) issues an IO request (e.g., IO request 20) to store data on a storage system (e.g., storage system 12). In this example, log buffer tail promotion process 10 may 300 receive the data at a storage processor (e.g., storage processor 100) and may write 302 the data to a head entry (e.g., head entry 418) of the log buffer (e.g., log buffer 400). In some implementations, a head entry may represent the next portion of a log buffer (e.g., log buffer 400) for receiving new data for storing in the storage system (e.g., storage system 12).

In some implementations and in response to writing 302 data to the log buffer (e.g., log buffer 400), log buffer tail promotion process 10 may send an acknowledgement signal or response to the host computing device that issued the IO request (e.g., IO request 20). In this manner, the host computing device may issue further IO requests without having to wait for the data of an IO request (e.g., IO request 20) to be written to a final storage location within the storage system (e.g., storage system 12). Additionally, log buffer 400 may be replicated and/or synchronized with a log buffer of another storage processor (e.g., storage processor 126) configured with storage processor 100 in an active/active configuration. Accordingly, the data entries (e.g., data entries 402, 404, 406, 408, 410, 412, 414, 416) of log buffer 400 may be preserved if storage processor 100 fails and/or log buffer 400 is corrupted.

In some implementations, log buffer tail promotion process 10 may flush 304, via a plurality of threads, at least a portion of the plurality of data entries of the log buffer to the storage system based upon, at least in part, a tail entry of the log buffer. As discussed above and in some implementations, the plurality of data entries may generally include newly received dirty/update pages before they are written to a final storage location in the storage system (e.g., within data array 112). In some implementations, new data may be received 300 by log buffer tail promotion process 10 (e.g., at a storage processor (e.g., storage processor 100)) and may be written 302 to a head entry (e.g., head entry 418) of a log buffer (e.g., log buffer 400).

Figure 5:
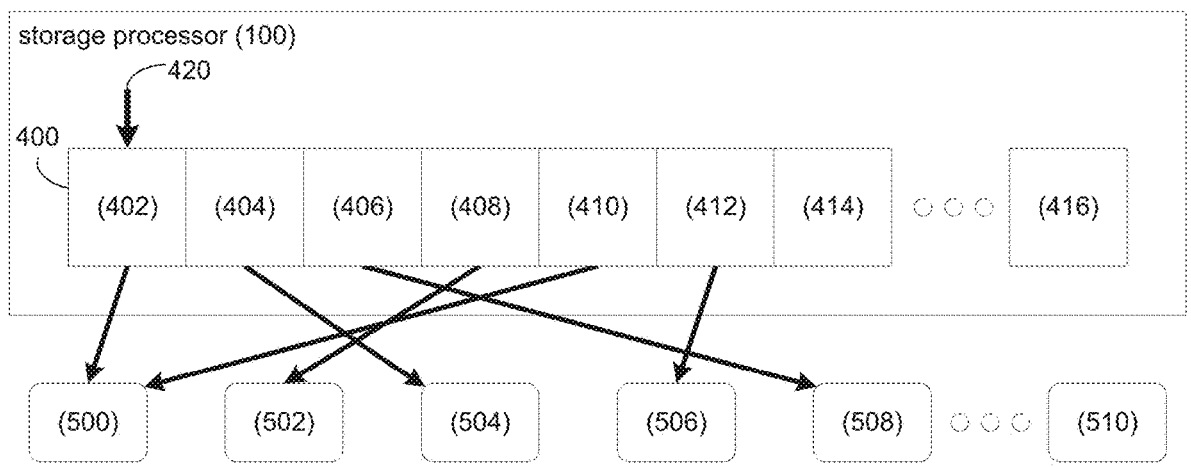

Referring also to the example of FIG. 5 and in some implementations, a storage system may include a plurality of threads (e.g., threads 500, 502, 504, 506, 508, 510) configured to flush at least a portion of the plurality of data entries (e.g., data entries 402, 404, 406, 408, 410, 412, 414, 416) of the log buffer (e.g., log buffer 400) to the storage system (e.g., to storage locations within data array 112). While an example of e.g., five threads has been described, it will be appreciated that any number of threads may be used within the scope of the present disclosure. In some implementations, a thread may generally include an instruction configured to perform an operation on the storage system. For example, a thread may be configured to be executed by a central processing unit (CPU) of the storage processor (e.g., storage processor 100). In some implementations and as will be discussed in greater detail below, each thread may be assigned to flush one or more data entries of the plurality of data entries of the log buffer. In some implementations, a thread may also be generally referred to as a worker or a flusher.

In some implementations, flushing, 304 via the plurality of threads, the at least a portion of the plurality of data entries of the log buffer to the storage system may include assigning 310 one or more data entries of the log buffer to one or more threads of the plurality of threads for flushing to the storage system, wherein the first data entry assigned to the plurality of threads is the tail entry of the log buffer. In some implementations, log buffer tail promotion process 10 may manage and distribute the work of flushing at least a portion of the plurality of data entries of a log buffer across the plurality of threads. In some implementations, log buffer tail promotion process 10 may assign 310 one or more tasks from the log buffer (e.g., from the tail entry to the head entry) to one or more threads of the plurality of threads. In some implementations, each thread may be assigned 310 one or more tasks, may execute the assigned one or more tasks, and upon completion, may update or promote the log buffer tail entry.

In some implementations, each thread may be configured to write the pages into a sub storage unit (e.g., a physical large block (PLB)), which may be two megabytes (e.g., 2 MB). In one example, with 2:1 compression and 2:1 deduplication, this assignment of tasks may be an equivalent of e.g., 2,048 4 KB pages for each physical block (e.g., 2048 4 KB user data pages=8 MB with 2:1 compression and 2:1 deduplication=8 MB/4=2 MB physical block). In this example, each thread may be assigned to flush e.g., 2,048 data entries or pages to allow each thread to fully write a physical block. However, it will be appreciated any number of data entries or pages may be assigned 310 to each of the plurality of threads.

In some implementations, to maintain a sequential logical block address (LBA), the plurality of threads may be assigned 310 data entries or pages that are ordered by logical block address and not by time of arrival/when written into the log buffer. In some implementations, this may result in the data entries or pages assigned 310 to one or more threads to not be ordered sequentially in the log buffer. As such, it may be difficult for the plurality of threads to know which data entry should be promoted to be the new tail entry. In some implementations, the assignment 310 of data entries or pages based on the logical block address may help the storage system to achieve better write amortization.

Referring again to the example of FIG. 5 and in some implementations, log buffer tail promotion process 10 may assign 310 one or more data entries of the plurality of data entries of the log buffer to each thread of the plurality of threads. For example, log buffer tail promotion process 10 may assign 310 data entries 402 and 410 to thread 500; data entry 404 to thread 504; data entry 406 to thread 508; and data entry 408 to thread 502. However, it will be appreciated that the data entries may be assigned 310 to the plurality of threads in various configurations within the scope of the present disclosure.

In some implementations, a thread that currently holds the tail entry (i.e., the thread that has flushed the data of the tail entry of the log buffer) may have the responsibility of traversing the log buffer until it determines the new tail entry. In some implementations, because the plurality of threads may complete flushing of their assigned data entries out of order, the thread that holds the current tail entry may need to traverse a very long path in the log buffer and process many log entries until a new tail entry can be determined. In some implementations, this process may require a log buffer spin-lock while traversing the log buffer data entries. As such, conventional approaches to determining a new tail entry may require significant log buffer lock contention as other threads may be locked out of reporting when data entries are flushed while the new tail entry is determined.

For example, log buffer tail promotion process 10 may flush 304, via the plurality of threads, at least a portion of the plurality of data entries of the log buffer to the storage system based upon, at least in part, the tail entry of the log buffer. Referring again to FIG. 5 and in one example, suppose thread 502 flushes data entry 408 first. In this example, thread 502 may report back to log buffer 400 that data entry 408 has been flushed to data array 112 (i.e., by invalidating data entry 408 from log buffer 400 in response to flushing 304 data entry 408 to data array 112). Continuing with this example, because data entry 408 is not the tail entry (i.e., thread 502 does not hold the tail entry), log buffer tail promotion process 10 may continue flushing data entries to the storage system.

Suppose thread 504 flushes data entry 404 next (i.e., after thread 502 flushes data entry 408). Thread 504 may report back to log buffer 400 that data entry 404 has been flushed to data array 112 (i.e., by invalidating data entry 404 from log buffer 400 in response to flushing data entry 404 to data array 112). In this example, because data entry 404 is not the tail entry (i.e., thread 504 does not hold the tail entry), log buffer tail promotion process 10 may continue flushing data entries to the storage system.

Continuing with the above example, suppose thread 500 flushes data entry 402 next (i.e., after thread 504 flushes data entry 404). In this example, thread 500 may report back to log buffer 400 that data entries 402 and 410 have been flushed to data array 112 (i.e., by invalidating data entries 402 and 410 from log buffer 400 in response to flushing data entries 402 and 410 to data array 112). As thread 500 holds tail entry 420 and because thread 500 has flushed tail entry 420 to data array 112, log buffer tail promotion process 10 may determine a new tail entry.

Figure 6:
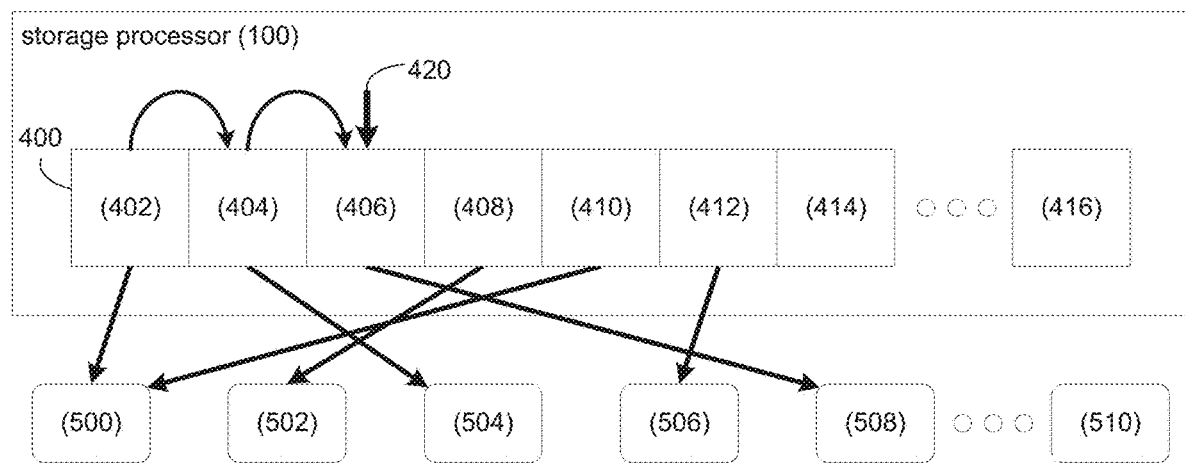

Referring also to the example of FIG. 6 and in some implementations, log buffer tail promotion process 10 may lock log buffer while thread 500 determines the next tail entry. In this example, thread 500 may traverse data entry 404 (which was previously flushed) and data entry 406 before determining that data entry 406 is to be the new tail entry as data entry 406 has not yet been flushed to data array 112. Accordingly, log buffer tail promotion process 10 may determine that data entry 406 is the new tail entry (e.g., tail entry 420) by moving the tail entry to data entry 406.

Continuing with the above example, suppose thread 508 flushes data entry 406 next (i.e., after thread 500 flushes data entries 402 and 410). In this example, thread 508 may report back to log buffer 400 that data entry 406 has been flushed to data array 112 (i.e., invalidate data entry 406 from log buffer 400 in response to flushing data entry 406 to data array 112). As thread 508 holds tail entry 420 and because thread 508 has flushed tail entry 420 to data array 112, log buffer tail promotion process 10 may determine a new tail entry.

Figure 7:
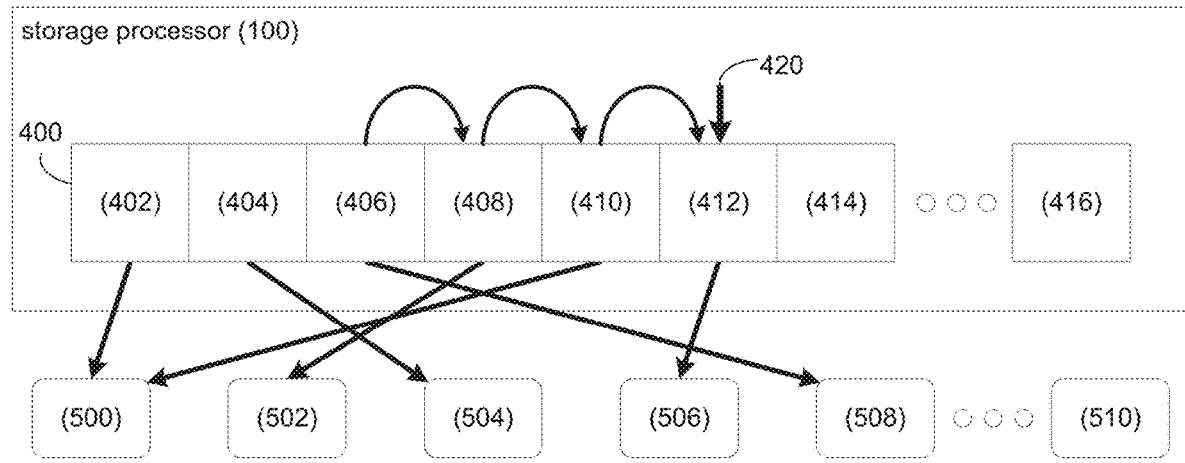

Referring also to the example of FIG. 7 and in some implementations, log buffer tail promotion process 10 may lock log buffer while thread 508 determines the next tail entry. In this example, thread 508 may traverse data entries 408 and 410 (which were previously flushed) and data entry 412 before determining that data entry 412 is to be the new tail entry as data entry 412 has not yet been flushed to data array 112. Accordingly, log buffer tail promotion process 10 may determine that data entry 412 is the new tail entry (e.g., tail entry 420) by moving the tail entry to data entry 412.

As shown above and in some implementations, log buffer tail promotion process 10 may experience significant log buffer lock contention as each thread reports its progress back to the log buffer and as a thread locks the log buffer to determine a new tail entry during conventional tail promotion determination processes.

In some implementations, log buffer tail promotion process 10 may update 306, via each thread of the plurality of threads, a queue of committed data entries with one or more data entries of the log buffer flushed to the storage system by each thread. In some implementations, the queue of committed data entries may be a data structure configured to be updated by each thread of the plurality of threads with the data entries flushed to the storage system. In some implementations, the queue of committed data entries may be separate from the log buffer. For example and as will be discussed in greater detail below, log buffer tail promotion process 10 may update 306 the queue of committee data entries without locking the log buffer.

Figure 8:
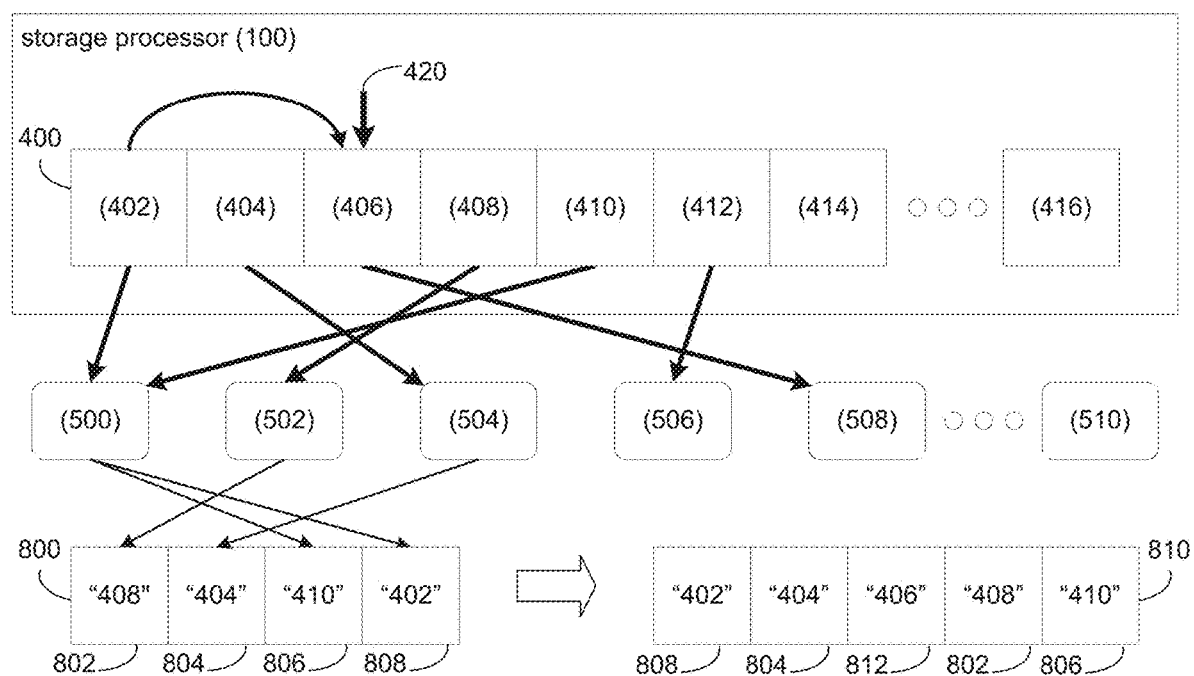
FIGS. 8-9 are example diagrammatic views of the operation of log buffers and queues of committed data entries within a storage processor according to one or more example implementations of the disclosure.

Referring also to the example of FIGS. 5 and 8 and in some implementations, suppose thread 502 flushes data entry 408 first. In this example, instead of reporting back to log buffer 400 that data entry 408 has been flushed to data array 112 (i.e., by invalidating data entry 408 from log buffer 400 in response to flushing 304 data entry 408 to data array 112) as discussed above, log buffer tail promotion process 10 may update 306 a queue of committed data entries (e.g., queue of committed data entries 800) to include an entry (e.g., entry 802) indicating that data entry 408 was flushed to data array 112.

In some implementations, log buffer tail promotion process 10 may determine 312 whether the thread has flushed the tail entry of the log buffer. Continuing with the above example where thread 502 flushes data entry 408 to data array 112. In this example, log buffer tail promotion process 10 may determine 312 whether thread 502 has flushed tail entry 420 of the log buffer. Accordingly, log buffer tail promotion process 10 may determine 312 that thread 502 has not flushed tail entry 420 as tail entry 420 (e.g., data entry 402) has been assigned to thread 502 (as shown in FIG. 5) but has not yet been flushed.

In some implementations, log buffer tail promotion process 10 may flush 314, via the thread, additional entries of the plurality of data entries of the log buffer assigned to the thread in response to determining 314 that the thread has not flushed the tail entry of the log buffer. Continuing with the above example where log buffer tail promotion process 10 determines 312 that thread 502 has not flushed tail entry 420, log buffer tail promotion process 10 may flush additional entries of the plurality of data entries of the log buffer assigned to thread 502.

Now suppose thread 504 flushes data entry 404 next (i.e., after thread 502 flushes data entry 408). In this example, instead of reporting back to log buffer 400 that data entry 404 has been flushed to data array 112 (i.e., by invalidating data entry 404 from log buffer 400 in response to flushing data entry 404 to data array 112) as discussed above, log buffer tail promotion process 10 may update 306 a queue of committed data entries (e.g., queue of committed data entries 800) to include an entry (e.g., entry 804) indicating that data entry 404 was flushed to data array 112.

In some implementations, log buffer tail promotion process 10 may determine 312 whether the thread has flushed the tail entry of the log buffer. Continuing with the above example where thread 504 flushes data entry 404 to data array 112, log buffer tail promotion process 10 may determine 312 whether thread 504 has flushed tail entry 420 of the log buffer. Accordingly, log buffer tail promotion process 10 may determine 312 that thread 504 has not flushed tail entry 420 as tail entry 420 (e.g., data entry 402) has been assigned to thread 502 (as shown in FIG. 5) but has not yet been flushed.

In some implementations, log buffer tail promotion process 10 may flush 314, via the thread, additional entries of the plurality of data entries of the log buffer assigned to the thread in response to determining 312 that the thread has not flushed the tail entry of the log buffer. In this example, log buffer tail promotion process 10 may flush 314 additional entries of the plurality of data entries of the log buffer assigned to thread 504.

Continuing with the above example, suppose thread 500 flushes data entry 410 next (i.e., after thread 504 flushes data entry 404). In this example, instead of reporting back to log buffer 400 that data entry 410 has been flushed to data array 112 (i.e., by invalidating data entry 410 from log buffer 400 in response to flushing data entry 410 to data array 112) as discussed above, log buffer tail promotion process 10 may update 306 a queue of committed data entries (e.g., queue of committed data entries 800) to include an entry (e.g., entry 806) indicating that data entry 410 was flushed to data array 112.

In some implementations, log buffer tail promotion process 10 may determine 312 whether the thread has flushed the tail entry of the log buffer. Continuing with the above example where thread 500 flushes data entry 410 to data array 112. In this example, log buffer tail promotion process 10 may determine 312 whether thread 500 has flushed tail entry 420 of the log buffer. Accordingly, log buffer tail promotion process 10 may determine 312 that thread 502 has not flushed tail entry 420 as tail entry 420 (e.g., data entry 402) has been assigned to thread 502 but has not yet been flushed.

In some implementations, log buffer tail promotion process 10 may flush 314, via the thread, additional entries of the plurality of data entries of the log buffer assigned to the thread in response to determining 312 that the thread has not flushed the tail entry of the log buffer. Continuing with the above example where log buffer tail promotion process 10 determines 312 that thread 500 has not flushed tail entry 420, log buffer tail promotion process 10 may flush 314 additional entries of the plurality of data entries of the log buffer assigned to thread 500. In this example, log buffer tail promotion process 10 may flush data entry 402 assigned to thread 500. Accordingly, instead of reporting back to log buffer 400 that data entry 402 has been flushed to data array 112 (i.e., invalidating data entry 402 from log buffer 400 in response to flushing 304 data entry 402 to data array 112) as discussed above, log buffer tail promotion process 10 may update 306 a queue of committed data entries (e.g., queue of committed data entries 800) to include an entry (e.g., entry 808) indicating that data entry 402 was flushed to data array 112.

In some implementations, log buffer tail promotion process 10 may determine 312 whether the thread has flushed the tail entry of the log buffer. Continuing with the above example where thread 500 flushes data entry 402 to data array 112. In this example, log buffer tail promotion process 10 may determine 312 whether thread 500 has flushed tail entry 420 of the log buffer. Accordingly, log buffer tail promotion process 10 may determine 312 that thread 502 has flushed tail entry 420.

In some implementations, log buffer tail promotion process 10 may aggregate 316 committed data entries from the queue of committed data entries into a list of one or more committed data entries and one or more uncommitted data entries in response to determining 312 that the thread has flushed the tail entry of the log buffer. Continuing with the above example where log buffer tail promotion process 10 determines 312 that thread 502 has flushed tail entry 420, log buffer tail promotion process 10 may aggregate 316 each of the committed data entries from the queue of committed data entries (e.g., queue of committed data entries 800) into a list of one or more committed data entries and one or more uncommitted data entries (e.g., list of one or more committed data entries and one or more uncommitted data entries 810). In some implementations, the list of one or more committed data entries and one or more uncommitted data entries may be a data structure that is separate from the log buffer and the queue of committed data entries that includes a list of one or more committed data entries (e.g., data entries 802, 804, 806, 808 from queue of committed data entries 800) and one or more uncommitted data entries (e.g., data entry 812). As shown in the example of FIG. 8 and in some implementations, the list of one or more committed data entries and one or more uncommitted data entries may be based upon, at least in part, the log buffer. For example and in some implementations, the list of one or more uncommitted data entries may include any data entries from the log buffer that have not been assigned to a thread for flushing to the data array and any data entries from the log buffer that have not been flushed based on the queue of one or more committed data entries.

In some implementations, log buffer tail promotion process 10 may determine 308, via a thread of the plurality of threads, a new tail entry of the log buffer based upon, at least in part, the queue of committed data entries. For example and referring again to FIG. 8, with the queue of committed data entries (e.g., queue of committed data entries 800), log buffer tail promotion process 10 may determine 308 a new tail entry (e.g., tail entry 420) of the log buffer (e.g., log buffer 400) without locking and traversing the log buffer (e.g., log buffer 400) as shown above in FIGS. 6-7.

For example and in some implementations, determining 308 the new tail entry of the log buffer may include determining 318 a first uncommitted data entry from the list of the one or more committed data entries and the one or more uncommitted data entries. Referring again to the example of FIG. 8 and in some implementations, log buffer tail promotion process 10 may determine 318 a first uncommitted data entry (e.g., uncommitted data entry 812) from the list of the one or more committed data entries and the one or more uncommitted data entries (e.g., list 810). In other words, as data entries 402, 404, 408, and 410 have been flushed, log buffer tail promotion process 10 may determine that data entry 406 has not been flushed and is the oldest data entry based upon uncommitted data entry 812 indicating that data entry 406 has not been flushed. Accordingly, log buffer tail promotion process 10 may determine 308 that data entry 406 is the new tail entry (e.g., tail entry 420). In some implementations, log buffer tail promotion process 10 may promote data entry 406 to be the new tail entry using queue of committed data entries 800 and list 810 and without locking and traversing the log buffer (e.g., log buffer 400).

Figure 9:
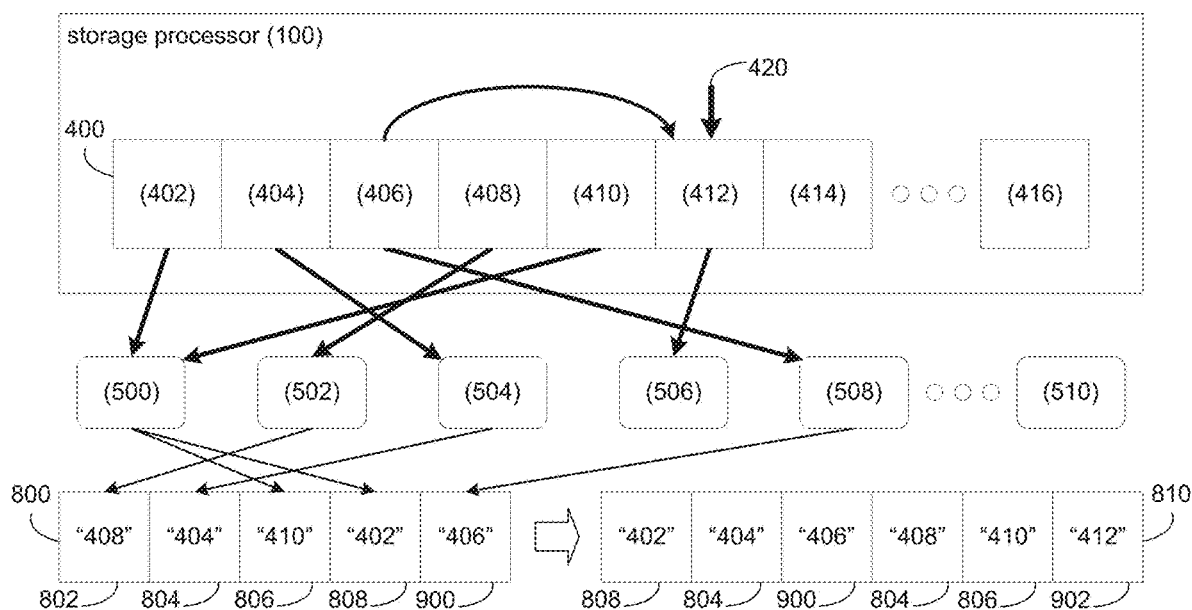

Referring also to FIG. 9 and continuing with the above example, suppose that thread 508 flushes data entry 406 next (i.e., after thread 500 flushes data entries 402 and 410). Accordingly, instead of reporting back to log buffer 400 that data entry 406 has been flushed to data array 112 (i.e., by invalidating data entry 406 from log buffer 400 in response to flushing 304 data entry 406 to data array 112) as discussed above, log buffer tail promotion process 10 may update 306 a queue of committed data entries (e.g., queue of committed data entries 800) to include an entry (e.g., entry 900) indicating that data entry 406 was flushed to data array 112.

In some implementations, log buffer tail promotion process 10 may determine 312 whether the thread has flushed the tail entry of the log buffer. Continuing with the above example where thread 508 flushes data entry 406 to data array 112. In this example, log buffer tail promotion process 10 may determine 312 whether thread 508 has flushed tail entry 420 of the log buffer. Accordingly, log buffer tail promotion process 10 may determine 312 that thread 508 has flushed tail entry 420 as tail entry 420 (e.g., data entry 406) has been flushed by thread 508.

In some implementations and as discussed above, log buffer tail promotion process 10 may aggregate 316 committed data entries from the queue of committed data entries into a list of one or more committed data entries and one or more uncommitted data entries in response to determining 312 that the thread has flushed the tail entry of the log buffer. In the above example where log buffer tail promotion process 10 determines 312 that thread 508 has flushed tail entry 420, log buffer tail promotion process 10 may aggregate 316 each of the committed data entries from the queue of committed data entries (e.g., queue of committed data entries 800) into a list of one or more committed data entries and one or more uncommitted data entries (e.g., list of one or more committed data entries and one or more uncommitted data entries 810) with one or more committed data entries (e.g., data entries 802, 804, 806, 808, 900 from queue of committed data entries 800) and one or more uncommitted data entries (e.g., data entry 902).

In some implementations and as discussed above, log buffer tail promotion process 10 may determine 308, via a thread of the plurality of threads, a new tail entry of the log buffer based upon, at least in part, the queue of committed data entries. Referring again to the example of FIG. 9 and in some implementations, log buffer tail promotion process 10 may determine 318 a first uncommitted data entry (e.g., uncommitted data entry 902) from the list of the one or more committed data entries and the one or more uncommitted data entries (e.g., list 810). In other words, as data entries 402, 404, 406, 408, and 410 have been flushed, log buffer tail promotion process 10 may determine that data entry 412 is the oldest data entry based upon uncommitted data entry 902 indicating that data entry 412 has not been flushed. Accordingly, log buffer tail promotion process 10 may determine 308 that data entry 412 is the new tail entry (e.g., tail entry 420). In some implementations, log buffer tail promotion process 10 may promote data entry 406 to be the new tail entry using queue of committed data entries 800 and list 810 and without locking and traversing the log buffer (e.g., log buffer 400).

In this manner, log buffer tail promotion process 10 may cooperatively promote new tail entries of a log buffer using a queue of committed data entries that is updated by each of the threads of the plurality of threads. In this manner, log buffer tail promotion process 10 may utilize a separate data structure (e.g., queue of committed data entries) to determine a new tail entry without locking and traversing the log buffer and without requiring each thread to lock the log buffer to invalidate data entries upon flushing the data entries to the storage system.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    receiving, via the computing device, data for storage in a storage system;
    writing the data to a head entry of a log buffer, wherein the log buffer includes a plurality of data entries for flushing to the storage system;
    flushing, via a plurality of threads, at least a portion of the plurality of data entries of the log buffer to the storage system based upon, at least in part, a tail entry of the log buffer, wherein flushing, via the plurality of threads, the at least a portion of the plurality of data entries of the log buffer to the storage system includes assigning one or more data entries of the log buffer to one or more threads of the plurality of threads for flushing to the storage system, wherein the one or more threads are assigned the at least a portion of the plurality of data entries ordered by logical block address, wherein a first data entry assigned to the plurality of threads is the tail entry of the log buffer;
    updating, via each thread of the plurality of threads, a queue of committed data entries with one or more data entries of the log buffer flushed to the storage system by each thread;
    determining whether the plurality of threads has flushed tail entry of the log buffer;
    in response to determining that the plurality of threads has flushed the tail entry of the log buffer, aggregating committed data entries from the queue of committed data entries into a list of one or more committed data entries and one or more uncommitted data entries; and
    determining, via a thread of the plurality of threads, a new tail entry of the log buffer based upon, at least in part, the queue of committed data entries, wherein the new tail entry of the log buffer indicates a next data entry to flush from the log buffer.

2. The computer-implemented method of claim 1, wherein determining the new tail entry of the log buffer includes determining a first uncommitted data entry from the list of the one or more committed data entries and the one or more uncommitted data entries.

3. The computer-implemented method of claim 1 further comprising:
    flushing, via the thread, additional entries of the plurality of data entries of the log buffer assigned to the thread in response to determining that the thread has not flushed the tail entry of the log buffer.

4. The computer-implemented method of claim 1, wherein the queue of committed data entries is separate from the log buffer.

5. A computer program product residing on a non-transitory computer readable medium having a plurality of instructions stored thereon which, when executed by a processor, cause the processor to perform operations comprising:
    receiving data for storage in a storage system;
    writing the data to a head entry of a log buffer, wherein the log buffer includes a plurality of data entries for flushing to the storage system;
    flushing, via a plurality of threads, at least a portion of the plurality of data entries of the log buffer to the storage system based upon, at least in part, a tail entry of the log buffer, wherein flushing, via the plurality of threads, the at least a portion of the plurality of data entries of the log buffer to the storage system includes assigning one or more data entries of the log buffer to one or more threads of the plurality of threads for flushing to the storage system, wherein the one or more threads are assigned the at least a portion of the plurality of data entries ordered by logical block address, wherein a first data entry assigned to the plurality of threads is the tail entry of the log buffer;
    updating, via each thread of the plurality of threads, a queue of committed data entries with one or more data entries of the log buffer flushed to the storage system by each thread;
    determining whether the plurality of threads has flushed tail entry of the log buffer;
    in response to determining that the plurality of threads has flushed the tail entry of the log buffer, aggregating committed data entries from the queue of committed data entries into a list of one or more committed data entries and one or more uncommitted data entries; and determining, via a thread of the plurality of threads, a new tail entry of the log buffer based upon, at least in part, the queue of committed data entries, wherein the new tail entry of the log buffer indicates a next data entry to flush from the log buffer.

6. The computer program product of claim 5, wherein determining the new tail entry of the log buffer includes determining a first uncommitted data entry from the list of the one or more committed data entries and the one or more uncommitted data entries.

7. The computer program product of claim 5, wherein the operations further comprise:
flushing, via the thread, additional entries of the plurality of data entries of the log buffer assigned to the thread in response to determining that the thread has not flushed the tail entry of the log buffer.

8. The computer program product of claim 5, wherein the queue of committed data entries is separate from the log buffer.

9. A computing system comprising:
a memory; and
a processor configured to receive data for storage in a storage system, wherein the processor is further configured to write the data to a head entry of a log buffer, wherein the log buffer includes a plurality of data entries for flushing to the storage system, wherein the processor is further configured to flush, via a plurality of threads, at least a portion of the plurality of data entries of the log buffer to the storage system based upon, at least in part, a tail entry of the log buffer, wherein flushing, via the plurality of threads, the at least a portion of the plurality of data entries of the log buffer to the storage system includes assigning one or more data entries of the log buffer to one or more threads of the plurality of threads for flushing to the storage system, wherein the one or more threads are assigned the at least a portion of the plurality of data entries ordered by logical block address, wherein a first data entry assigned to the plurality of threads is the tail entry of the log buffer, wherein the processor is further configured to update, via each thread of the plurality of threads, a queue of committed data entries with one or more data entries of the log buffer flushed to the storage system by each thread, wherein the processor if further configured to determine whether the plurality of threads has flushed tail entry of the log buffer, and in response to determining that the plurality of threads has flushed the tail entry of the log buffer, aggregate committed data entries from the queue of committed data entries into a list of one or more committed data entries and one or more uncommitted data entries, and wherein the processor is further configured to determine, via a thread of the plurality of threads, a new tail entry of the log buffer based upon, at least in part, the queue of committed data entries, wherein the new tail entry of the log buffer indicates a next data entry to flush from the log buffer.

10. The computing system of claim 9, wherein determining the new tail includes determining a first uncommitted data entry from the list of the one or more committed data entries and the one or more uncommitted data entries.

11. The computing system of claim 9, wherein the processor is further configured to:
flush, via the thread, additional entries of the plurality of data entries of the log buffer assigned to the thread in response to determining that the thread has not flushed the tail entry of the log buffer.

\* \* \* \* \*